Feb. 18, 1969   H. B. VOELCKER, JR   3,428,917
SIGNALLING BY ANGLE CODING
Filed May 13, 1966

INVENTOR.
HERBERT B. VOELCKER, JR.
BY Brumbaugh Free Graves & Donohue
his ATTORNEYS

United States Patent Office 3,428,917
Patented Feb. 18, 1969

3,428,917
SIGNALLING BY ANGLE CODING
Herbert B. Voelcker, Jr., Rochester, N.Y., assignor to Research Corporation, New York, N.Y., a nonprofit corporation of New York
Filed May 13, 1966, Ser. No. 550,030
U.S. Cl. 332—11          2 Claims
Int. Cl. H03k 7/08; H03c 3/00

This invention relates generally to the conveyance of information by electric signals and, more particularly, to methods and means for so conveying such information by coding the angle of a signal wave.

For a better understanding of the invention, reference is made to the following description of exemplary embodiments thereof and to the accompanying drawing wherein.

Figure 1:
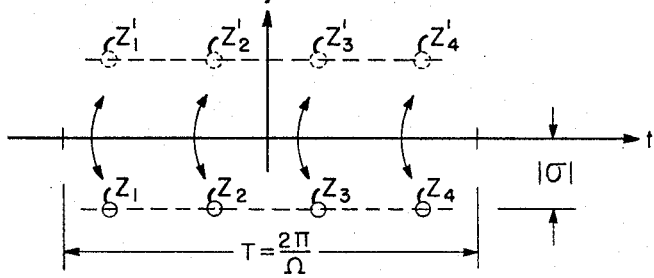
FIG. 1 is a Z-plane diagram of a pattern of complex zeros characterizing a signal wave according to the invention.

The mathematical basis for the methods and means to be described herein is set forth in my article "Toward a Unified Theory of Modulation, Part I, Phase-Envelope Relations" which appeared in the Proceedings of the IEEE, vol. 54, No. 3, March 1966. That article involves a study of bandlimited waves which exhibit simultaneous phase and envelope fluctuations. It was found that phase and envelope fluctuations are related and that both are describable in terms of the real or complex zeros of the wave, i.e., in terms of the real or complex roots of a polynomial representative of the wave. When the wave is periodic, its zeros can be determined from the factorization of its Fourier series representation. The considerations just mentioned led to the conclusion expressed in my article that the zeros of a bandlimited signal wave or other wave can be regarded as fundamental information attributes of that wave in the sense that, from the information point of view, any such wave is fully specified by its real and complex zeros, wherefore the wave itself can be treated in terms of the set or pattern of the real and complex zeros characterizing that wave.

Real and complex zeros are also discussed in an article by Bond and Cahn entitled "On Sampling the Zeros of Bandwidth Limited Signals" and appearing in IRE Transactions on Information Theory, vol. IT–4, pp. 110–113, September 1958. The Bond and Cahn article, does not, however, disclose any way for realizing the results obtainable by the present invention.

It is, of course, well known in the art to modulate a carrier wave by analog angle modulation such as is produced by conventional frequency modulation or phase modulation. The present invention is concerned with a different kind of modulation referred to herein as angle coding.

The distinctive attribute of a coding scheme is finite variability; signalling is effected via a finite set of prearranged message waveforms. The angle coding technique disclosed herein is one wherein the envelope of the transmitted wave is uninformative. That is, the angle-coded wave disclosed herein has a predictable envelope and a discrete number of angle "states." As later will be apparent, it is to be distinguished from quantized FM which is also an angle coding scheme but is inefficient.

Zero conjugation is the essence of angle coding according to the present invention. In a time-frequency region of size $n$, one can have $n$ zeros; if these are first order complex, $2^n$ envelope-invariant code sequences can be generated by systematic conjugation. Envelope invariance does not denote the absence of fluctuations. Rather, it means waveshape invariance over a group of signals called the "common envelope set" (see my aforementioned article). Various ways of implementing such systematic conjugation will now be discussed.

Consider first the problem of generating $2^n$ different but envelope-invariant real signals which are periodic in $T = 2\pi/\Omega$. One can start from a set of $2^n$ zero patterns, each containing $n$ first order complex zeros, which differ only by the conjugation of one or more zeros. Let $n^{(u)}$ denote the $u$th pattern in the set, $u$–1, 2 . . . $2^n$. The $u$th real signal must be (see p. 77 of the mentioned article):

$$s_{u,\,\omega_0}(t) = Re\left\{\exp(j\omega_0 t)k_u \prod_{i=1}^{n^{(u)}}[1-\exp\{j\Omega(t-z_i)\}]\right\} \quad (1)$$

where $k_u$ is a normalizing constant. Because (1) expands into an $(n+1)$-term real F-series, $s_u\omega_0(t)$ can be generated by Fourier synthesis. The complete set of $2^n$ signals can be generated simultaneously via $2^n$ linear networks driven in parallel by $n+1$ harmonic oscillators.

There is a related technique, however, which is both simpler and more interesting, and which will be disclosed herein in detail. This other technique entails multiplication of $n$ real "elementary signals." Specifically, for $\omega_0$ sufficiently larger than $\Omega$:

$$s_{u,\,n\omega_0}(t) = k'_{u,\,n}BPF(n\omega_0)\prod_{i=1}^{n^{(u)}}Re\{(1-\exp[j\omega(t-Z_i)])\exp(j\omega_0 t)\} \quad (2)$$

where BPF ($n\omega_0$) denotes the selection, by bandpass filtering, of the spectral band near $n\omega_0$. My aforementioned article under the heading "Second Example" describes and illustrates the conjugate MP and MaxP forms of a real elementary signal. Such a signal is easy to generate because it consists merely of two tones, and it can be conjugated by interchanging the magnitude coefficients of the tones. Implementation of (2) thus can be effected by two tone sources and $n$ combining networks to generate the elementary signals, plus multiplying and filtering circuits.

Only one more step is needed: temporal variability must be introduced so that the angle encoder produces contiguous single periods from various members of the periodic signal set. A single period of $s_{u,\,n\omega_0}(t)$ is, for example, $$y_u(t) = s_{u,\,n\omega_0}(t),\ |t|<T/2 \quad (3)$$
$$= o,\ |t|>T/2$$

which is aperiodic and thus can be used as a signalling waveform in a sequential system. Note that $y_u(t)$ must have, by virtue of its aperiodicity and finite duration, an infinity of Z-plane zeros and an infinite spectrum. The spectrum is in fact the line spectrum of (2) interpolated by sinc ($fT$) functions (see the text Probability and Information Theory by P. M. Woodward, Pergamon Press, London, 1953). Nevertheless it is easily shown that the $n$ codable zeros determine the attributes of $y_u(t)$ for $t<T/2$, and that the "effective bandwidth" of $y_u(t)$ is approximately $n\Omega/2\pi$ Hz. when $n$ is large.

FIG. 1 provides an understanding from the graphic point of view of how the complex zeros of the signal may be conjugated to produce angle coding of the signal. In FIG. 1 the signal is shown in its unmodulated state and as being characterized by four complex zeros $Z_1$, $Z_2$, $Z_3$, $Z_4$ within the period T. Each of these four complex zeros lies within the lower half plane (LHP) of the shown Z-plane diagram. The location of each zero in the Z-plane can be expressed in terms of two coordinates, namely a phase ($\tau$) or horizontal coordinate and a magnitude ($\sigma$) coordinate.

The signal can be changed from its unmodulated state to a selected modulated state by causing the complex zeros to assume patterns different from that shown in FIG. 1. Such different patterns can be generated by, for example, changing the $\tau$ values of the zeroes or changing their $\sigma$ magnitudes. A particularly convenient way, however, of generating different complex zero patterns is to conjugate the zeroes in a permutative manner from the lower half plane (LHP) to the upper half plane (UHP) of the Z-plane diagram. Thus, for example, the zero $Z_1$ may be selectively conjugated (by means later described) from the LHP up to the UHP to the location $Z_1'$. In like manner, the other zeros $Z_2$, $Z_3$ and $Z_4$ may each be selectively conjugated from their shown locations in the LHP to the UHP so as to assume, respectively, the new locations $Z_2'$, $Z_3'$ and $Z_4'$. During any period T, any selected one, some or all of the shown zeros may be so conjugated. Hence by selective conjugation of the zeros, one may generate fifteen different complex zero modulation patterns in addition to the basic unmodulated pattern shown in FIG. 1. The mentioned sixteen patterns evidently correspond to the sixteen permutations of a four digit binary code.

Figure 2:
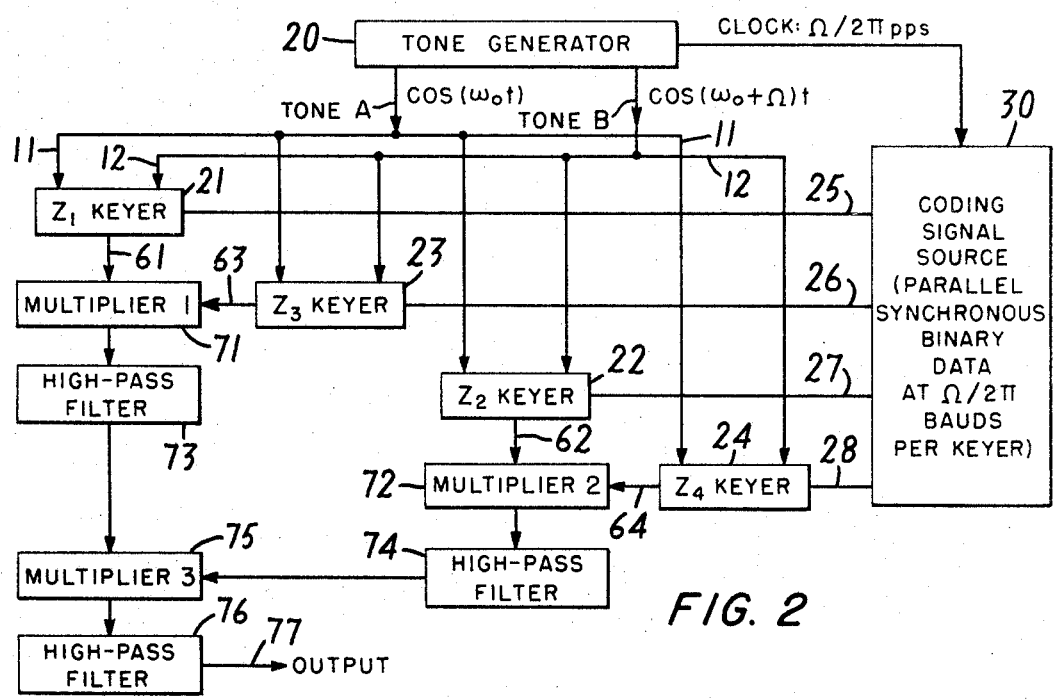
FIG. 2 is a block diagram of exemplary apparatus for effecting conjugation in a permutable manner of the complex zeros shown in FIG. 1.

A signal characterized by a permutable complex zero pattern of the sort described is conveniently generated by the apparatus shown in block diagram in FIG. 2. In that apparatus a conventional tone generator 20 produces outputs of a first pure cosine electric wave designated as tone A, a second pure cosine electric wave designated as tone B, and, also, a succession of clock pulses occurring at a rate of $\Omega/2\pi$ pps. Mathematically speaking, the tones A and B correspond to, respectively, the term $\cos(\omega_0 t)$ and the term $\cos(\omega_0+\Omega)t$.

Each of tones A and B is fed by leads generally designated as 11, 12, to each of four keyer units 21, 22, 23, 24 which correspond to the complex zeros $Z_1$, $Z_2$, $Z_3$ and $Z_4$, respectively. The four keyers 21, 22, 23 and 24 are controlled by respectively, outputs 25, 26, 27 and 28 of a coding signal source 30. The source 30 may be, say, a general purpose digital computer adapted to supply parallel synchronous binary data in the form of successive four digit binary codes to the outputs 25–28. The clock pulses from tone generator 20 are utilized in a well known manner to cause source 30 to feed those successive codes to the mentioned outputs at a rate of $\Omega/2\pi$ Bauds per keyer.

Figure 3:
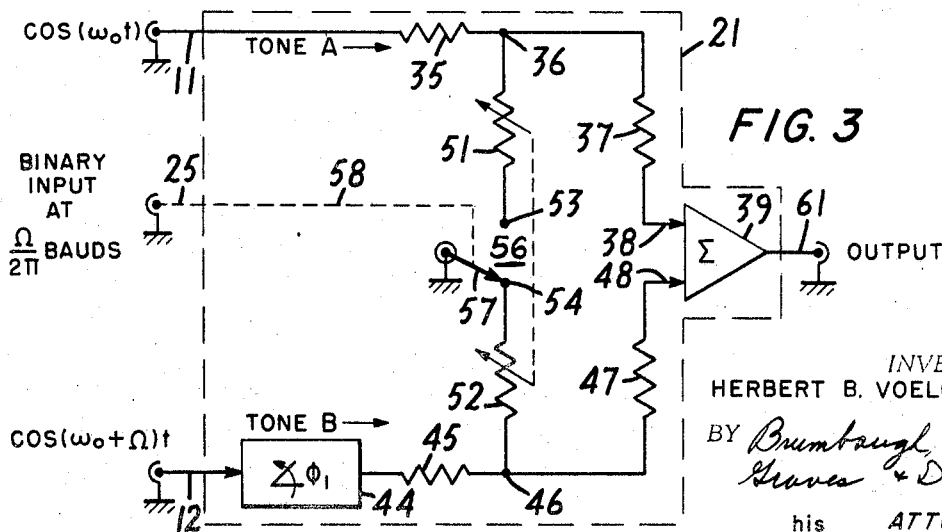
FIG. 3 is a schematic diagram of one of the components of the FIG. 2 apparatus.

FIG. 3 is a schematic diagram of a circuit which is used in each of the keyers but which is specifically shown as being the circuit for the $Z_1$ keyer 21. In the FIG. 3 circuit, the tone A signal is passed through resistor 35, junction 36, and resistor 37 to one input 38 of a differential amplifier 39, while the tone B signal is passed through a phase adjuster 44, resistor 45, junction 46 and resistor 47 to the other input 48 of the amplifier. The junctions 36 and 46 are connected through ganged variable resistors 51 and 52 to separate terminals 53 and 54 of a switch 55 which is represented in FIG. 3 as being a mechanical switch 56 having a movable contact 57 controlled (as depicted by dotted line 58) by a signal source output 25 so as to ground terminal 54 when a binary "0" digit is at 25 and to ground terminal 53 when a "1" digit is at that output. In practice, however, switch 56 may be a similarly controlled electronic switch.

The FIG. 3 circuit operates as follows. The amplifier 39 derives from the tone A and B inputs to the circuit a conjugating signal which appears at the output 61 for the amplifier and which is of the form:

$$a \cos(\omega_0 t) - b \cos[(\omega_0+\Omega)t - \phi_1] \quad (3)$$

The relative magnitude of the amplitude coefficients $a$ and $b$ are determined by the switch 56 under the control of the binary digit appearing at signal source output 25. When that digit is "0," switch 56 shunts terminal 54 to ground to render $b$ less than $a$ so as to provide a conjugating signal causing the $Z_1$ complex zero to be in the LHP of the Z-plane diagram (FIG. 1). When, on the other hand, the digit at 25 is "1," switch 56 shunts terminal 53 to ground to render $a$ less than $b$ so as to provide a conjugating signal causing the $Z_1$ complex zero to be at the location $Z_1'$ in the UHP of the Z-plane diagram. The $\tau$ value of zero $Z_1$ is adjustable by phase adjuster 44 and the $\sigma$ value of that zero may be changed by adjustment of the ganged variable resistors 51 and 52.

Returning now to FIG. 2, each of the other keyers 22–24 provides a similar conjugating signal which controls in like manner the position in the Z-plane of the complex zero corresponding to that keyer. The signals from keyers 21 and 23 are supplied to a multiplier 71, the signals from keyers 22 and 24 are supplied to a multiplier 72, and the respective outputs of those two multipliers are passed via separate high-pass filters 73 and 74 to a third multiplier 75. The output of the latter multiplier is passed through a high-pass filter 76 to the output 77 of the FIG. 3 apparatus.

Each of the mentioned multipliers is a conventional analog multiplier. The effect of each multiplier on its two inputs is to multiply the envelope functions of these inputs but to add the angular values thereof. Hence, during any period, the signal wave at output 77 will be characterized by an angle corresponding to a particular complex zero pattern selected by the four digit binary code then appearing at the outputs 25–28 of source 30. As mentioned, there are sixteen of such patterns of which each is selected by a respective one of the sixteen permutations of the four digit code from the coding signal source. It follows, therefore, that the signal wave may be either left unmodulated so as to be characterized by the complex zero pattern shown in FIG. 1 (the unmodulated state being produced by a "0000" code from source 30) or, alternatively, the signal wave may be selectively angle coded in any of fifteen different ways.

In connection with the foregoing, it should be noted that the conjugation or non-conjugation of each of the zeros $Z_1$, $Z_2$, $Z_3$ and $Z_4$ during a period T is not, physically speaking, sequentially effected during successive time intervals of which each is a subperiod of T and in each of which a corresponding one of the zeros is conjugated or not. Instead, the creation of any particular selected zero conjugation pattern during a particular period T should be regarded as a whole period phenomenon which is produced by the collective action of the four outputs from the four keyers 21–24.

An encoder of the sort described has been built and operated with $\Omega/2\pi = 500$ Hz., $\omega_0/2\pi = 10$ kHz. The elementary signal tone ratio was 0.6 such that $\Omega|0| \approx 0.51$, and the keying note (per keyer) was 62.5 Bauds and higher. The encoder produced an angle coded signal wave in the manner described herein.

The disclosed angle coded wave may be transmitted, received and then decoded to recover the data originally coded on the wave. The decoding may be effected either by conventional FM detector techniques or by a cross-correlation type receiver incorporating a plurality of angle encoders of the sort described. Each angle encoder in the receiver is programmed to generate the conjugate of a respective one of the different angle codings imparted to the transmitted signal wave. That is, for a signal wave having $n$ conjugable complex zeros per period T so that the pattern per period of those zeros can be any selected one of $2^n$ conjugation patterns, $2^n$ programmed encoders in the receiver will suffice to decode all of the angle codings corresponding to those $2^n$ patterns. Assuming, however, a signal wave with $n$ complex zeros per period T, it is not necessary to provide as many as $2^n$ angle codings of the signal wave nor as many as $2^n$ programmed encoders in the receiver.

An angle coded wave of the sort described is bandlimited and, for its bandwidth, has a high information capacity (especially in relation to conventional frequency modulation) while, at the same time being completely predictable in envelope. Accordingly, such wave is highly useful as a vehicle for the transmission of discrete information such as, for example, quantized speech, digital computer data and so forth.

I claim:

1. Apparatus comprising, source means of a signal wave characterized in each of predetermined periods of time by a pattern of complex zeros, source means of a permutable coding signal, and encoder means responsive to different permutations of said coding signal to angle code said wave by conjugating said zeros in a discrete permutative manner so as to provide for said wave during different ones of said periods a plurality of different standardized complex zero patterns of which each corresponds to a respective one of said different permutations of said coding signal.

2. Apparatus comprising, source means of first and second fixed frequency electric signal tones of different frequency, a plurality of tone combining means each adapted to combine said two tones in differential relation so as to form an output respective to that combining means, a plurality of amplitude modifying means of which each is associated with a respective one of said combining means and is adapted in a first state to render the amplitude of said first tone supplied to the associated combining means greater than that of said second tone supplied thereto and in a second state to render the amplitude of said second tone supplied to such combining means greater than that of said first tone supplied thereto, source means of a permutable code signal comprised of binary digits of which each corresponds to a respective one of said modifying means, said last named source means being coupled to said plurality of modifying means so as to select the state of each thereof in accordance with the digital value of the binary digit corresponding to that modifying means, and multiplier means coupled to said plurality of combining means to multiply the respective outputs thereof so as to provide as the product of said outputs an angle coded output signal wave.

References Cited
UNITED STATES PATENTS 3,320,534    5/1967    Altonji _____ 332—11

OTHER REFERENCES

Bond et al.: "On Sampling the Zeros of Bandwidth Limited Signals," September 1958, pp. 110–113, I.R.E. Transactions on Information Theory—332–11.

ALFRED L. BRODY, *Primary Examiner.*

U.S. Cl. X.R.

325—38; 332—9, 22; 340—347